United States Patent [19]

Russo et al.

[11] Patent Number: 4,601,917

[45] Date of Patent: Jul. 22, 1986

[54] LIQUID COATING COMPOSITION FOR PRODUCING HIGH QUALITY, HIGH PERFORMANCE FLUORINE-DOPED TIN OXIDE COATINGS

[75] Inventors: David A. Russo, Edison, N.J.; Georg H. Lindner, Vlissingen, Netherlands

[73] Assignee: M&T Chemicals Inc., Woodbridge, N.J.

[21] Appl. No.: 784,279

[22] Filed: Oct. 4, 1985

Related U.S. Application Data

[63] Continuation-in-part of Ser. No. 705,595, Feb. 26, 1985, abandoned, which is a continuation-in-part of Ser. No. 687,065, Dec. 28, 1984, abandoned, which is a continuation-in-part of Ser. No. 598,623, Apr. 10, 1984, abandoned.

[51] Int. Cl.$^4$ .................. B05D 7/22; B05D 5/12; C03C 17/245

[52] U.S. Cl. .................. 427/109; 106/287.19; 427/160; 427/166

[58] Field of Search .................. 106/287.19; 427/109, 427/160, 166

[56] References Cited

U.S. PATENT DOCUMENTS 4,293,594 10/1981 Yoldas et al. .................. 427/109 X Primary Examiner—James R. Hoffman
Attorney, Agent, or Firm—S. H. Parker; J. Matalon; R. E. Bright

[57] ABSTRACT

A liquid coating composition for producing high quality, high performance fluorine-doped tin oxide coatings by chemical vapor deposition includes 1–30 wt. % of a reactive fluorine dopant compound and 70–99 wt. % of an organotin compound.

62 Claims, 1 Drawing Figure

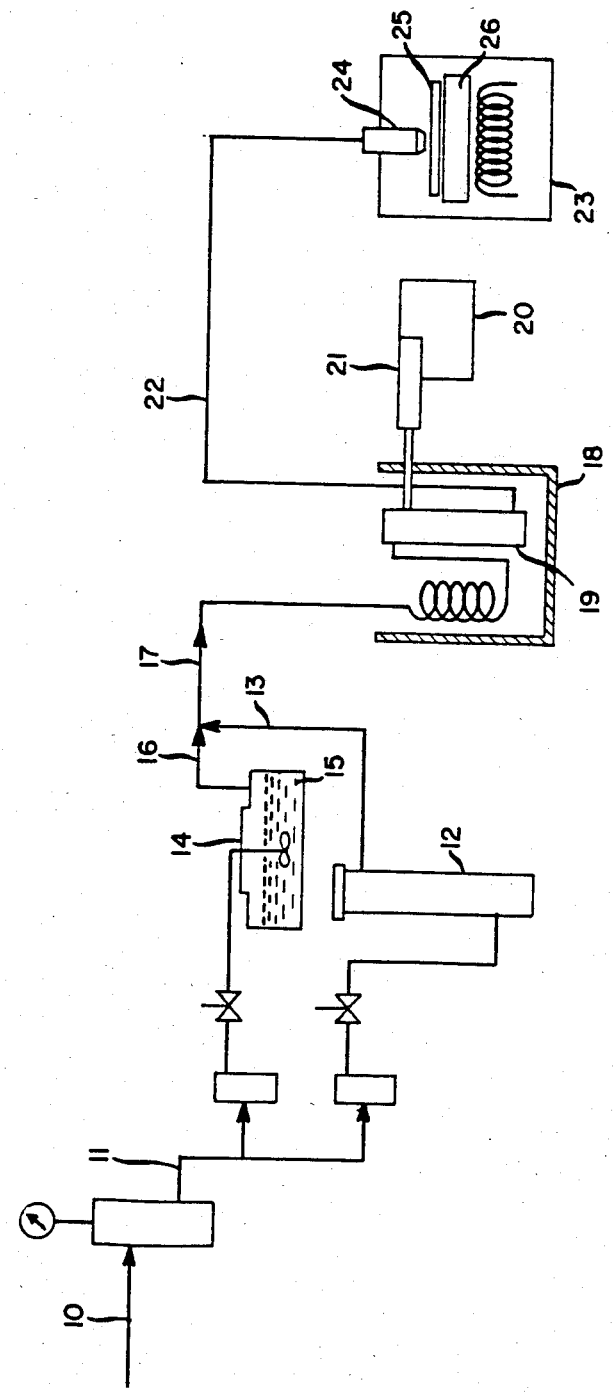

LIQUID COATING COMPOSITION FOR PRODUCING HIGH QUALITY, HIGH PERFORMANCE FLUORINE-DOPED TIN OXIDE COATINGS

CROSS-REFERENCE TO RELATED APPLICATIONS

This application is a continuation-in-part of copending U.S. Ser. No. 705,595, filed Feb. 26, 1985, which itself was a continuation-in-part of co-pending U.S. Ser. No. 687,065, filed Dec. 28, 1984, which itself was a continuation-in-part of co-pending U.S. Ser. No. 598,623, filed Apr. 10, 1984, by Georg H. Lindner and David A. Russo, all now abandoned.

BACKGROUND OF THE INVENTION

1. Field of the Invention

This invention relates to fluorine-doped tin oxide coatings, and more particularly, to a liquid coating composition for producing high quality fluorine-doped tin oxide coatings having a low sheet resistance and high visible light transmission.

2. Description of the Prior Art

Fluorine-doped tin oxide coatings are known to impart useful properties to many different substrate surfaces, including glass, ceramics, metals and elemental filaments. Such coated substrates find use as heat reflective elements, in energy efficient windows and in optoelectronic and semiconductor devices.

Several methods have been described in the literature to make such tin oxide coatings, including solution spray, chemical vapor deposition, powder deposition and ion sputtering. See, for example, U.S. Pat. Nos. 3,677,814; 3,759,743; 3,949,146; 4,130,673; 4,265,974; 4,293,594; 4,325,988; 4,389,238; 4,500,567; German Pat. No. 3,010,077 (1980); Japan Kokai No. 75 61 415 (1975); Japan Kokai No. 75 61 416 (1975); Japan Kokai No. 75 61695 (1975); and U.S.S.R. No. 142,000 (Chem. Abs. 56, 13676f).

These methods all suffer from one or more disadvantages in that the process conditions, or compositions used, or the properties of the resulting tin oxide coatings, are not entirely satisfactory for certain commercial applications. Where the product is an energy efficient window, for example, success has been limited by the relatively high sheet resistance and low visible transparency of the coatings, or by the cost of the process.

The solution spray method is described, for example, in Japan Kokai No. 75 61,415. In this method a solution of dibutyltin diacetate and ethyl trifluoroacetate in isopropyl alcohol as a solvent is sprayed onto a glass plate to provide fluorine-doped tin oxide coatings. However, a large amount of solvent is present in the solution, generally about 50 wt %, which must be removed during the process. Furthermore, the electrical resistivity of the coatings obtained have an unacceptable value of 230 ohms/square.

A chemical vapor deposition method is disclosed by Kato et al. in U.S. Pat. No. 4,500,567. The process uses a gaseous mixture of butyltin trichloride and dichlorodifluoromethane which is formed from separate gaseous streams of each reactant. The gaseous mixture then is deposited onto a glass surface. However, in this method, it is inconvenient to control the flow rates of the gaseous streams, and the electrical properties of the coating are not adequate.

Gordon, in U.S. Pat. No. 4,265,974, teaches that mixtures of tetramethyltin and α-fluoroalkyl halides can be decomposed to provide fluorine-doped tin oxide films with good optical and electrical properties. However, the reaction mixture is explosive in air above 1.9 wt % tetramethyltin, which severely limits the rate of deposition of the coating on sheet glass. In addition, tetramethyltin and its decomposition by-products are very toxic.

Yoldas, in U.S. Pat. No. 4,293,594, discloses a vapor deposition method of forming a highly conductive transparent fluorine-doped tin oxide coating for fluorescent lamps. The patentee uses a gaseous mixture of dimethyltin dichloride and dimethyltin difluoride in an oxygen-containing carrier gas to produce the coating. However, these tin compounds are solids which must be vaporized at high temperatures to provide a gaseous mixture.

As will be apparent from the above-described review of the prior art, there is a need for an improved process of making high quality, high performance fluorine-doped tin oxide coatings.

Accordingly, it is an object of this invention to provide an improved method for forming high quality, high performance fluorine-doped tin oxide coatings.

A particular object herein is to provide a liquid coating composition for the production of such fluorine-doped tin oxide coatings under advantageous process conditions.

Still another object herein is to provide a liquid coating composition which includes the fluorine dopant and organotin compounds in predetermined concentration ranges, and from which fluorine-doped tin oxide coatings which have a low sheet resistance and high visible transparency may be made in a relatively short deposition time.

SUMMARY OF THE INVENTION

In accordance with the invention, there is provided herein a liquid coating composition for making fluorine-doped tin oxide coatings on substrates such as glass which have a low sheet resistance and high light transmission. The composition comprises:

(a) 1–30 wt. % of a reactive organic fluorine dopant compound where at least one fluorine atom is located alpha or beta to a functional group wherein carbon is bonded to oxygen selected from carboxylic acid, anhydride, ester, alcohol, ketone, acid halide or ether; and (b) 70–99 wt % of an organotin compound which is an alkyltin trichloride, a dialkyltin dichloride, an alkyldichlorotin acetate, an alkylchlorotin diacetate, or an ester tin trichloride; or tin tetrachloride.

Representative reactive organic fluorine dopants include trifluoroacetic acid, trifluoroacetic anhydride, ethyl trifluoroacetoacetate, trifluoroethanol, ethyl trifluoroacetate, pentafluoropropionic acid, 2-chloro-1,1,2-trifluoroethyl methyl ether, 1,1,1-trifluoroacetylacetone and heptafluorobutyryl chloride.

Typical organotin compounds include monobutyltin trichloride, dibutyltin dichloride, butyldichlorotin acetate, butylchlorotin diacetate, carbethoxyethyltin trichloride. Tin tetrachloride also may be used as the tin compound.

In a preferred form of the invention, the liquid coating composition includes 2–10 wt % of the organic fluorine compound, and 90–98 wt % of the organotin compound.

The liquid coating composition of the invention may include also a polar organic compound, in an amount of about 1–10 wt % of the composition, which will insure stability of the liquid composition at low temperatures. When the polar organic liquid is present, the liquid coating composition includes 2–10 wt % of the organic fluorine compound, 80–97 wt % of the organotin compound and 1–10 wt % of the polar organic liquid.

In a preferred form of the invention the fluorine dopant is trifluoroacetic acid, trifluoroacetic anhydride, or ethyl trifluoroacetoacetate, and the organotin compound is monobutyltin trichloride.

The method used herein to produce high quality, high performance fluorine-doped tin oxide coatings from the liquid coating composition of the invention is chemical vapor deposition. In this method the liquid composition is vaporized and contacted in an oxygen-containing atmosphere with a substrate maintained at a temperature above the decomposition temperature of said vapor. Preferably vaporization of the liquid coating composition is carried out by injecting the liquid into a carrier gas maintained at a temperature sufficient to vaporize said liquid.

Deposition is carried out on glass for 45 seconds or less, to produce a fluorine-doped tin oxide coating having a thickness of 160–220 nm, a sheet resistance of less than 40 ohms/sq, a visible light transmission of at least 80% and an IR reflectivity of 70% or more. In the preferred form of the invention, the deposition time is 10 seconds or less and the sheet resistance is 30 ohm/sq. or less.

BRIEF DESCRIPTION OF THE DRAWINGS

In order to better understand the invention reference will be made to the accompanying drawing in which:

The FIGURE is a schematic diagram of an apparatus for carrying out a coating process using the liquid coating composition of the invention.

DETAILED DESCRIPTION OF THE INVENTION

Referring now to the FIGURE, there is shown a diagrammatic representation of an apparatus suitable for carrying out the process of the present invention. Accordingly, a carrier gas 10 which includes oxygen, with air being preferred, is metered through a feed line 11 at a predetermined flow rate suitably about 1–30 l/min., and preferably about 3–15 l/min., through an air dryer tower 12 to provide a stream 13 of dry air. A separate air stream may be directed through a humidifier 14 containing a suitable quantity of water 15 to provide a wet air stream 16 at a desired relative humidity. Thereby an air stream 17, either dry or wet, may be passed through an evaporator 18 contained in oil bath 19 for holding the liquid coating composition of the invention. The liquid composition is supplied to evaporator 18 by syringe pump 20 and syringe 21. The air stream is heated from the oil bath to a desired vaporization temperature before it enters evaporator 18.

The vaporized liquid coating composition in the air stream 22 travels to a deposition chamber 23 having a coating nozzle 24 in which a substrate 25 is mounted on a heated plate 26. After deposition of the desired coating the gaseous by-products of the deposition are exhausted.

The liquid coating composition of the invention is made up of:

(a) 1–30 wt. % of a reactive organic fluorine dopant compound where at least one fluorine atom is located alpha or beta to a functional group wherein carbon is bonded to oxygen, selected from carboxylic acid, anhydride, ester, alcohol, ketone, acid halide or ether;

(b) 70–99 wt. % of an organotin compound which is an alkyltin trichloride, a dialkyltin dichloride, an alkyldichlorotin acetate, an alkylchlorotin diacetate or an ester tin trichloride.

Accordingly, suitable functional groups and reactive organic fluorine dopants include the following:

Carboxylic acids
    trifluoroacetic acid
    chlorodifluoroacetic acid
    difluoroacetic acid
    heptofluorobutynic acid
    pentafluoropropionic acid
    3-trifluoromethylcrotonic acid Anhydrides
    trifluoroacetic anhydride
    heptafluorobutyric anhydride
    pentafluoropropionic anhydride
    chlorodifluoroacetic anhydride
    perfluoroglutaric anhydride
    perfluorosuccinic anhydride Esters
    ethyl trifluoroacetate
    butyl trifluoroacetate
    ethyl bromodifluoroacetate
    ethyl chlorofluoroacetate
    methyl pentafluoropropionate
    methyl heptofluorobutyrate
    methyl trifluoroacetate
    methyl perfluorobuten-3-oate
    2,2,2-trifluoroethyltrifluoroacetate
    1,1,1-trifluoroisopropylacetate Alcohols
    2,2,2-trifluoroethanol
    1H,1H-heptafluorobutanol-1
    3,3,4,4,5,5,5-heptafluoropentanol-2
    heptafluoroisopropanol
    hexafluoro-2-methylisopropanol
    1H,1H,5H-octafluoro-1-pentanol
    perfluoro-t-butanol
    2-trifluoromethylpropanol-2
    1,1,1-trifluoropropanol-2

Ketones
    ethyl 4,4,4-trifluoroacetoacetate
    1,1,1-trifluoroacetylacetone
    bis(perfluoroisopropyl)ketone
    3-bromo-1,1,1-trifluoropropanone
    ethyl 4,4,4-trifluoroacetoacetate
    hexafluoroacetylacetone
    pentafluoroethyl ethyl ketone
    1,1,1-trifluoroacetone
    methyl heptafluoropropyl ketone Acid halides
    heptafluorobutyryl chloride
    perflouroglutaryl fluoride
    perfluoroctanoyl chloride Ethers
    2-chloro-1,1,2-trifluoroethyl methyl ether
    2-chloro-1,1,2-trifluoroethyl ethyl ether The term "alkyl" used herein includes a straight chain and branched alkyl group which has one to six carbon atoms.

The term "organotin" compound used herein includes tin tetrachloride.

Accordingly, suitable organotin compounds include monobutyltin trichloride, isobutyltin trichloride, methyltin trichloride, dibutyltin dichloride, diisobutyltin dichloride, di-t-butyltin dichloride, butyldichlorotin acetate, butylchlorotin diacetate, and carbethoxyethyltin trichloride: and tin tetrachloride.

Preferably, the liquid coating composition comprises 2-10 wt % of trifluoroacetic acid, trifluoroacetic anhydride or ethyl trifluoroacetoacetate, and 90-98 wt % of monobutyltin trichloride.

The essential characteristic of the coating composition of the invention is that it is liquid at room temperature and includes a predetermined high concentration of the tin component with a sufficient amount of fluorine dopant.

The liquid coating composition of the invention also may include 1-10% of a polar organic compound, such as methylisobutyl ketone, acetic anhydride or ethyl acetate, which will insure that the composition remains stable in one liquid phase below room temperature, e.g. even at $-15°$ C. Thereby the liquid composition may be conveniently stored outdoors or transported during winter weather without becoming hazy which would evidence phase separation. Preferably the liquid coating composition then includes 2-10 wt % of the organic fluorine compound, 80-97 wt % of the organotin compound and 1-10 wt % of the polar organic liquid.

The vaporization temperature in the process usually ranges from about 100° to about 400° C., and preferably about 150° to 250° C. The substrate temperature ranges from above 400° to about 700° C., preferably about 550° to about 650° C.

The carrier gas is an oxygen-containing gas which may be air or a mixture of oxygen and an inert gas, and is preferably air.

The carrier air may be dry or wet in the process of the invention, and, accordingly, the relative humidity of the air at 18° C. may vary from 0-100%. Preferably the humidity ranges from 10-50%, where the rate of deposition is enhanced without introducing unnecessary haze into the coating.

The air flow preferably ranges from about 1 to about 20 l/min. with the preferred rate being about 3-15 l/min.

The substrate to be coated may be glass, ceramics, solid state materials, metals, elemental filaments and the like.

The process conditions can be varied to provide a hard, resistant fluorine-doped tin oxide coating on many substrates with acceptable transmittance, reflectance and conductivity properties. For example, if the substrate to be coated is glass made by the floatation process, the sheet resistance of the coating at a thickness of about 160 to 250 nm will be 40 ohm/sq. or less, and, in a preferred form of the invention, less than 30 ohms/sq. Thicker films above 250 nm will have lower sheet resistances but the light transmittance of the glass will be reduced. Below 160 nm thickness the conductivity of the glass will be too low and the film will permit too great a heat loss from a room protected by such coated glass.

The sheet resistance (ohms/sq) of the tin oxide film is measured with a conventional four point probe according to ASTM standard method F374-81.

The film thickness is measured by the beta-back-scatter method according to British Standards Institution method BS5411: Part 12, 1981, ISO 3543-1981.

The infrared reflectivity is measured by a specular reflectance technique described by J. Stewart in "Infrared Spectroscopy", Marcel Dekker, Inc., N.Y. 1970 p. 539 ff.

The visible transmittance is measured on a UV/vis spectrophotometer over the 400-800 nm region, versus air and the % $T_{vis}$ is averaged over the wavelengths.

The bulk conductivity was determined from the sheet resistance and the film thickness according to the well known relationship.

$$\sigma = \frac{1}{R_\square \cdot t}$$

where
$\sigma$ equals conductivity in (ohm cm)$^{-1}$
$R_\square$ equals sheet resistance in ohms/sq.
$t$ equals film thickness in centimeters.

Films prepared according to the preferred embodiments of the invention have infrared reflectivities greater than 70% at the conventional 10 micron wavelength of light which is characteristic of thermal infrared radiation at room temperature, visible transmittance of 80% or greater, sheet resistances of less than 40 ohm/sq. and conductivities greater than 1250 (ohm cm)$^{-1}$ for films 1600-2500 nm thick. The films show a very light orange color in transmitted light, a light blue iridescence in reflected light, and are substantially haze-free.

The advantages of this invention can be more readily appreciated by reference to the following examples. It should be noted that in each example the results shown in the Tables are the best achievable over a range of process conditions. In these examples the process parameters are (1) the rate of addition of the liquid composition at a (2) predetermined vaporization temperature given as the temperature of the carrier air, (3) the flow rate of the carrier air, (4) the relative humidity of the carrier air, (5) the deposition temperature, which is given as the temperature of the heating block, and (6) the time of deposition. The properties of the coatings are (1) sheet resistance, (2) film thickness and (3) film conductivity.

The components of the liquid coating composition of the invention are presented in the Tables as follows:

LIQUID COATING COMPOSITION

Organic Fluorine Dopant Compound
　TFA=trifluoroacetic acid
　TFAA=trifluoroacetic anhydride
　ETFAA=ethyl trifluoroacetoacetate
　ETFA=ethyl trifluoroacetate
　PFPA=pentafluoropropionic acid
　TFE=trifluoroethanol
　TFME=2-chloro-1,1,2-trifluoroethyl methyl ether
　TFAC=1,1,1-trifluoroacetylacetone
Organotin Compound
　MBTC=monobutyltin trichloride
　ESTC=carbethoxyethyltin trichloride
　BDTA=butyldichlorotin acetate
　BCTA=butylchlorotin diacetate
　IBTC=isobutyltin trichloride
　DIBTC=diisobutyltin dichloride
　DBTC=dibutyltin dichloride
　DTBTC=di-t-butyltin dichloride
　MTC=methyltin trichloride
　TT=tin tetrachloride
Polar Organic Compound
　ACAN=acetic anhydride
　ETAC=ethyl acetate
　MIBK=methylisobutyl ketone

TABLE I

| Composition (% by wt.) | 1<br>5.7% TFA<br>94.3% MBTC | 2<br>→ | 3<br>→ | 4<br>6% TFA<br>94% MBTC | 5<br>4.8% TFAA<br>95.2% MBTC | 6*<br>4/5% TFA<br>4.5% ACAN<br>91.0% MBTC | 7*<br>4.6% TFA<br>2.3% ETAC<br>93.1 MBTC | 8*<br>4.5% TFA<br>4.5% ACAN<br>91.0 MBTC | 9*<br>4.5% TFA<br>4.5% ACAN<br>91.0% MBTC |
|---|---|---|---|---|---|---|---|---|---|
| PROCESS CONDITIONS | | | | | | | | | |
| Rate of addition of liquid composition (ml/hr) | 9.7 | 19.4 | 19.4 | 14 | 6.5 | 17.8 | 19.4 | 20.5 | 9.5 |
| Temperature of carrier air (°C.) | 140 | 150 | 150 | 180 | 150 | 150 | 150 | 167 | 150 |
| Flow rate of carrier air (l/min.) | 10 | 10 | 10 | 4.6 | 10 | 10 | 10 | 3.7 | 4.2 |
| Relative humidity of air at 18° C. (%) | 14 | 100 | 0 | 14 | 47 | 47 | 47 | 14 | 14 |
| Temperature of heating block (°C.) | 630 | 560 | 560 | 625 | 560 | 655 | 690 | 650 | 650 |
| Deposition time (sec) | 9 | 6 | 32 | 10 | 14 | 5 | 4 | 8 | 7 |
| PROPERTIES OF THE COATING | | | | | | | | | |
| Sheet resistance R (ohm/sq) | 28 | 37 | 36 | 37 | 26 | 22 | 22 | 35 | 32 |
| Film thickness (nm) | 187 | 198 | 194 | 192 | 200 | 200 | 185 | 207 | 200 |
| Conductivity (ohm cm)$^{-1}$ | 1910 | 1365 | 1432 | 1406 | 1932 | 2270 | 2460 | 1380 | 1562 |

*liquid stays clear at −15° C.

TABLE II

| Composition (% by wt.) | 10<br>25.6% TFA<br>74.4% ESTC | 11<br>5% TFA<br>95% BDTA | 12<br>18% TFA<br>82% BCTA | 13<br>10% TFA<br>90% IBTC | 14<br>5% TFA<br>95% DIBTC | 15<br>7.8% TFA<br>9.8% ACAN<br>82.4% DBTC | 16<br>8.3% TFA<br>8.3% ACAN<br>83.4% DTBTC | 17<br>7% TFA<br>10% ACAN<br>83% MTC | 18<br>4% TFA<br>96% TT |
|---|---|---|---|---|---|---|---|---|---|
| PROCESS CONDITIONS | | | | | | | | | |
| Rate of addition of liquid composition (ml/hr) | 14.4 | 30.6 | 30.6 | 30.6 | 30.6 | 22.3 | 22.3 | 15.5 | 6.5 |
| Temperature of carrier air (°C.) | 200 | 204 | 200 | 150 | 150 | 200 | 175 | 125 | 150 |
| Flow rate of carrier air (l/min.) | 3.7 | 3.7 | 3.7 | 3.7 | 3.7 | 3.7 | 3.7 | 3.7 | 10 |
| Relative humidity of air (%) | 25 | 75 | 100 | 50 | 50 | 50 | 50 | 50 | 47 |
| Temperature of heating block (°C.) | 650 | 650 | 650 | 650 | 650 | 650 | 650 | 650 | 560 |
| Deposition time (sec) | 40 | 7 | 30 | 45 | 18 | 27 | 7.5 | 7 | 18 |
| PROPERTIES OF THE COATING | | | | | | | | | |
| Sheet resistance R (ohm/sq) | 24 | 35 | 39 | 38 | 32 | 30 | 31 | 34 | 30 |
| Film thickness (nm) | 206 | 201 | 198 | 203 | 188 | 201 | 205 | 211 | 200 |
| Conductivity (ohm cm)$^{-1}$ | 2022 | 1421 | 1302 | 1296 | 1661 | 1658 | 1574 | 1394 | 1667 |

TABLE I, Examples 1-9

In these examples a glass substrate is coated by chemical vapor deposition using a liquid coating composition of trifluoroacetic acid or trifluoroacetic anhydride, and monobutyltin trichloride, within predetermined compositional ranges. In Examples 6-9 a small amount of acetic anhydride, ethyl acetate or methylisobutyl ketone is included in the composition as a low temperature phase stabilizer.

The results of Examples 1-9 demonstrate that trifluoroacetic acid and trifluoroacetic anhydride (from which trifluoroacetic acid is formed in situ in a humid air atmosphere) provide fluorine-doped tin oxide coatings having high performance properties, including a sheet resistance below 40 ohm/sq. at a film thickness of about 200 nm and a deposition time below 35 seconds. In Examples 6 and 7, an advantageous sheet resistance of 22 ohm/sq is obtained. Typically, the infrared reflectivity of the tin oxide coatings produced in the Examples was greater than 70% as measured at 10 microns. The visible light transmission of the coatings in the Examples was 80% or greater.

With respect to process conditions, it is apparent, that at a given addition rate, the presence of some moisture during deposition is desirable to reduce the deposition time.

TABLE II, Examples 10-18

In Table II there is shown the results of coating a glass substrate by chemical vapor deposition from a liquid coating composition of liquid trifluoroacetic acid and various organotin compounds other than butyltin trichloride.

Tin tetrachloride in combination with TFA provides fluorine-doped tin coatings having excellent properties under advantageous reaction conditions.

TABLE III, Examples 19–25

In Table III there is shown results with fluorine dopants other than TFA and TFAA in combination with MBTC or MTC. It is seen that ethyl trifluoroacetoacetate, ETFAA, provides an excellent coating even at low concentrations of the dopant in the composition. ETFA and TFE are suitable dopants but both require a relatively higher concentration of dopant. Furthermore these dopants require a higher rate of addition of the composition into the deposition chamber to provide reasonable deposition times. PFPA dopant provides a liquid coating composition at a low dopant concentration. TFME and TFAC also are effective dopants to provide low sheet resistance coatings.

TABLE IV, Examples 26–33

Comparative Examples 26–33 were based upon coating compositions containing an organic fluorine dopant which did not include a fluorine atom alpha or beta to a functional group, as defined for the reactive fluorine dopants of the liquid coating composition of the invention.

Ex. 26. TFM = trifluoromethyl bromide
Ex. 27. BBTF = bromobenzotrifluoride
Ex. 28. FB = 4-fluorobenzene
Ex. 29. FBTF = o-fluorobenzotrifluoride
Ex. 30. TFMB = trifluoromethylbenzene
Ex. 31. TFB = trifluorobenzene
Ex. 32. TCFE = 1,1,2-trichlorotrifluoroethane
Ex. 33. DCFM = dichlorodifluoromethane In these examples it was found that the sheet resistances of the coatings obtained with the above listed organic fluorine dopants are excessively high, i.e. greater than 48 ohms per square, for use of such coatings as conductive tin oxide coatings on glass substrates.

TABLE III

| | Example No. | | | | | | |
|---|---|---|---|---|---|---|---|
| Composition (% by wt.) | 19<br>5% ETFAA<br>95% MBTC | 20<br>7% ETFAA<br>10% ACAN<br>83.9% MTC | 21<br>25% ETFA<br>75% MBTC | 22<br>16% TFE<br>84% MBTC | 23<br>3.5% PFPA<br>96.5% MBTC | 24<br>10% TFME<br>90% MBTC | 25<br>5% TFAC<br>95% MBTC |
| PROCESS CONDITIONS | | | | | | | |
| Rate of addition of liquid composition (ml/hr) | 15.1 | 22.3 | 26 | 9.7 | 6.5 | 115 | 14 |
| Temperature of carrier air (°C.) | 150 | 150 | 150 | 150 | 150 | 160 | 150 |
| Flow rate of carrier air (l/min) | 3.7 | 3.7 | 10 | 10 | 10 | 11 | 11 |
| Relative humidity of air (%) | 100 | 50 | 0 | 0 | 0 | 3 | 71 |
| Temperature of heating block (°C.) | 650 | 650 | 620 | 560 | 625 | 665 | 600 |
| Deposition time (sec) | 4 | 7.5 | 18 | 41 | 33 | 12.5 | 6.5 |
| PROPERTIES OF THE COATING | | | | | | | |
| Sheet resistance R (ohm/sq) | 29 | 37 | 24 | 25 | 35 | 32 | 34 |
| Film thickness (nm) | 196 | 220 | 200 | 224 | 190 | 202 | 190 |
| Conductivity (ohm cm)$^{-1}$ | 1759 | 1228 | 2083 | 1786 | 1540 | 1547 | 1548 |

TABLE IV

COMPARATIVE EXAMPLES

| | Example No. | | | | | | | |
|---|---|---|---|---|---|---|---|---|
| Composition (% by wt.) | 26<br>92% TFM<br>8% MBTC | 27<br>20% BBTF<br>80% MBTC | 28<br>5% FB<br>95% MBTC | 29<br>5% FBTF<br>95% MBTC | 30<br>16% TFMB<br>84% MBTC | 31<br>44% TFB<br>56% MBTC | 32<br>20% TCFE<br>80% MBTC | 33<br>99.9% DCFM<br>0.1% MBTC |
| PROCESS CONDITIONS | | | | | | | | |
| Rate of addition of liquid composition (ml/hr) | 4.9 | 2.9 | 15.1 | 15.1 | 13 | 26 | 13 | 7.2 × 10$^4$ DCFM<br>0.3 MBTC |
| Temperature of carrier air (°C.) | 150 | 194 | 150 | 200 | 150 | 150 | 150 | 150 |
| Flow rate of carrier air (l/min) | 12 | 2.5 | 2 | 2 | 10.6 | 6.3 | 10.6 | 3.75 |
| Relative humidity of air (%) | 14 | 6 | 44 | 14 | 0 | 0 | 0 | 0 |
| Temperature of heating block (°C.) | 500 | 675 | 650 | 650 | 500 | 660 | 500 | 650 |
| Deposition time (sec) | 30 | 30 | 6 | 10 | 85 | 14 | 72 | 30 |
| PROPERTIES OF THE COATING | | | | | | | | |
| Sheet resistance R (ohm/sq) | 51 | 69 | 104 | 197 | 85 | 74 | 90 | 73 |
| Film thickness (nm) | 220 | 257 | 183 | 198 | 190 | 190 | 190 | 200 |
| Conductivity (ohm cm)$^{-1}$ | 891 | 564 | 525 | 256 | 619 | 711 | 585 | 685 |

While the invention has been defined with reference to certain preferred embodiments thereof, it will be understood that changes and modifications may be made which are within the skill of the art. It is intended to be bound by the appended claims in which:

What is claimed is:

1. A liquid coating composition for making high quality fluorine-doped tin oxide coatings having a low sheet resistance and high visible light transmission comprising:
   (a) 1-30 wt. % of a reactive organic fluorine dopant compound where at least one fluorine atom is located alpha or beta to a functional group wherein carbon is bonded to oxygen, selected from carboxylic acid, anhydride, ester, alcohol, ketone, acid halide, or ether: and
   (b) 70-99 wt % of an organotin compound which is an alkyltin trichloride, a dialkyltin dichloride, an alkyldichlorotin acetate, a alkylchlorotin diacetate, or an ester tin trichloride; or tin tetrachloride.

2. A liquid coating composition according to claim 1 wherein said functional group is a carboxylic acid.

3. A liquid coating composition according to claim 1 wherein said functional group is an anhydride.

4. A liquid coating composition according to claim 1 wherein said functional group is an ester.

5. A liquid coating composition according to claim 1 wherein said functional group is an alcohol.

6. A liquid coating composition according to claim 1 wherein said functional group is a ketone.

7. A liquid coating composition according to claim 1 wherein said functional group is an acid halide.

8. A liquid coating composition according to claim 1 wherein said functional compound is an ether.

9. A liquid coating composition according to claim 1 wherein said organotin compound is an alkyltin trichloride.

10. A liquid coating composition according to claim 1 wherein said organotin compound is a dialkyltin dichloride.

11. A liquid coating composition according to claim 1 wherein said organotin compound is an alkylchlorotin diacetate.

12. A liquid coating composition according to claim 1 wherein said organotin compound is an alkyldichlorotin acetate.

13. A liquid coating composition according to claim 1 wherein said organotin compound is an ester tin trichloride.

14. A liquid coating composition according to claim 1 comprising:
   (a) 1-30 wt. % of a reactive organic fluorine dopant compound which is trifluoroacetic acid, trifluoroacetic anhydride, ethyl trifluoroacetoacetate, trifluoroethanol, ethyl trifluoroacetate, pentafluoropropionic acid, 2-chloro-1,1,2-trifluoroethyl methyl ether, or 1,1,1-trifluoroacetylacetone; and
   (b) 70-99 wt. % of an organotin compound which is an alkyltin trichloride, a dialkyltin dichloride, an alkyldichlorotin acetate, an alkylchlorotin diacetate, an ester tin trichloride: or tin tetrachloride.

15. A liquid coating composition according to claim 14 wherein said organotin compound is monobutyltin trichloride, methyltin trichloride, isobutyltin trichloride, dibutyltin dichloride, di-t-butyltin dichloride, butyldichlorotin acetate, butylchlorotin diacetate, or carbethoxyethyltin trichloride.

16. A liquid coating composition according to claim 15 in which said organotin compound is monobutyltin trichloride.

17. A liquid coating composition according to claim 15 in which said organotin compound is methyltin trichloride.

18. A liquid coating composition according to claim 15 in which said organotin compound is isobutyltin trichloride.

19. A liquid coating composition according to claim 15 in which said organotin compound is dibutyltin dichloride.

20. A liquid coating composition according to claim 15 in which said organotin compound is di-t-butyltin dichloride.

21. A liquid coating composition according to claim 15 in which said organotin compound is butyldichlorotin acetate.

22. A liquid coating composition according to claim 15 in which said organotin compound is butylchlorotin diacetate.

23. A liquid coating composition according to claim 15 in which said organotin compound is carbethoxyethyltin trichloride.

24. A liquid coating composition according to claim 15 in which said fluorine dopant is trifluoroacetic acid, and said organotin compound is monobutyltin trichloride.

25. A liquid coating composition according to claim 15 comprising 2-10 wt. % of said organic fluorine dopant and 90-98 wt. % of said organotin compound.

26. A liquid coating compound according to claim 25 in which said fluorine dopant is trifluoroacetic acid and said organotin compound is monobutyltin trichloride.

27. A liquid coating composition according to claim 25 in which said fluorine dopant is trifluoroacetic and said organotin compound is butyldichlorotin acetate.

28. A liquid coating composition according to claim 25 in which said fluorine dopant is ethyl trifluoroacetoacetate and said organotin compound is monobutyltin trichloride.

29. A liquid coating compound according to claim 25 in which said fluorine dopant is trifluoroacetic acid and said organotin compound is diisobutyltin dichloride.

30. A liquid coating composition according to claim 25 in which said fluorine dopant is ethyl trifluoroacetate and said organotin compound is monobutyltin trichloride.

31. A liquid coating composition according to claim 25 in which said fluorine dopant is pentafluoropropionic acid and said organotin compound is monobutyltin trichloride.

32. A liquid coating compound according to claim 25 in which said fluorine dopant is trifluoroethanol and said organotin compound is monobutyltin trichloride.

33. A liquid coating composition according to claim 25 in which said fluorine dopant is 2-chloro-1,1,2-trifluoroethylmethyl ether and said organotin compound is monobutyltin trichloride.

34. A liquid coating composition according to claim 25 in which said fluorine dopant is 1,1,1-trifluoroacetyl acetone and said organotin compound is monobutyltin trichloride.

35. A liquid coating composition according to claim 14 in which said fluorine dopant is trifluoroacetic acid.

36. A liquid coating composition according to claim 14 in which said fluorine dopant is trifluoroacetic anhydride.

37. A liquid coating composition according to claim 14 in which said fluorine dopant is ethyl trifluoroacetoacetate.

38. A liquid coating composition according to claim 14 in which said fluorine dopant is trifluoroethanol.

39. A liquid coating composition according to claim 14 in which said fluorine dopant is ethyl trifluoroacetate.

40. A liquid coating composition according to claim 14 in which said fluorine dopant is pentafluoropropionic acid.

41. A liquid coating composition according to claim 14 in which said fluorine dopant is 2-chloro-1,1,2-trifluoroethyl methyl ether.

42. A liquid coating composition according to claim 14 in which said fluorine dopant is 1,1,1-trifluoroacetylacetone.

43. A liquid coating composition according to claim 1 in which said fluorine dopant is 2-10 wt % and said organotin compound is 90-98 wt. %, of the composition.

44. A liquid coating composition according to claim 1 in which said fluorine dopant is about 5 wt. % and said organotin compound is about 95 wt. % of the composition.

45. A liquid coating composition according to claim 1 which also includes 1-10 wt. % of a polar organic compound.

46. A liquid coating composition according to claim 45 in which said fluorine dopant is 2-10 wt. %, said organotin compound is 80-97 wt. %, and said polar organic compound is 1-10 wt. %, of said composition.

47. A liquid coating composition according to claim 46 comprising 2-10 wt. % of trifluoroacetic acid, 80-97 wt. % of monobutyltin trichloride and 1-10 wt. % of a polar organic liquid.

48. A liquid coating composition according to claim 46 in which the polar organic compound is methylisobutyl ketone, acetic anhydride or ethyl acetate.

49. A liquid coating composition for making high quality fluorine-doped tin oxide coatings having a low sheet resistance and high visible light transmission comprising:
(a) 1-30 wt. % of a reactive organic fluorine dopant compound where at least one fluorine atom is located alpha or beta to a functional group wherein carbon is bonded to oxygen selected from carboxylic acid, anhydride, ester, alcohol, ketone, acid halide, or ether; and
(b) 70-99 wt. % of tin tetrachloride.

50. A liquid coating composition according to claim 49 comprising:
(a) 1-30 wt. % of an organic fluorine dopant compound which is trifluoroacetic acid, trifluoroacetic anhydride, ethyl trifluoroacetoacetate, trifluoroethanol, ethyl trifluoroacetate, pentafluoropropionic acid, 2-chloro-1,1,2-trifluoroethyl methyl ether, or 1,1,1-trifluoroacetylacetone; and
(b) 70-99 wt. % of tin tetrachloride.

51. A liquid coating composition according to claim 49 in which said fluorine dopant is 2-10 wt. %, and said tin tetrachloride is 90-98 wt. % of the composition.

52. A liquid coating composition according to claim 49 in which said fluorine dopant is about 5 wt. %, and said organotin compound is about 95 wt. % of the composition.

53. A liquid coating composition according to claim 52 in which said fluorine dopant is trifluoroacetic acid.

54. A method of producing a high quality fluorine-doped tin oxide coating having a low sheet resistance and high visible light transmission comprising:
(a) forming a liquid coating composition of claim 49;
(b) vaporizing said liquid composition; and
(c) contacting said vapor in an oxygen-containing atmosphere with a substrate maintained at a temperature above the decomposition temperature of said vapor.

55. A method of producing a high quality fluorine-doped tin oxide coating having a low sheet resistance and high visible light transmission comprising:
(a) forming a liquid coating composition of claim 1;
(b) vaporizing said liquid composition; and
(c) contacting said vapor in an oxygen-containing atmosphere with a substrate maintained at a temperature above the decomposition temperature of said vapor.

56. A method of producing a high quality fluorine-doped tin oxide coating according to claim 55 in which said oxygen-containing atmosphere is air.

57. A method according to claim 55 where said vaporization temperature is about 100°-400° C.

58. A method according to claim 55 where said vaporization temperature is about 150°-250° C.

59. A method according to claim 55 where said decomposition temperature is above 400° and below 700° C.

60. A method according to claim 55 where said decomposition temperature is about 550°-650° C.

61. A method according to claim 55 where said deposition is carried out for 45 seconds or less to produce a coating having a thickness of 160-220 nm, a sheet resistance of less than 40 ohms/square, an infrared reflectivity of greater than 70% and a visible light transmission of at least 80%.

62. A method according to claim 55 where said substrate is glass.

* * * * *